US009070139B2

United States Patent
Zhang

(10) Patent No.: US 9,070,139 B2
(45) Date of Patent: Jun. 30, 2015

(54) ESTIMATING UNIQUE IMPRESSIONS IN AN ONLINE VIDEO DISTRIBUTION SYSTEM

(71) Applicant: HULU, LLC, Santa Monica, CA (US)

(72) Inventor: Tony T. Zhang, San Diego, CA (US)

(73) Assignee: HULU, LLC, Santa Monica, CA (US)

( * ) Notice: Subject to any disclaimer, the term of this patent is extended or adjusted under 35 U.S.C. 154(b) by 91 days.

(21) Appl. No.: 13/622,984

(22) Filed: Sep. 19, 2012

(65) Prior Publication Data

US 2014/0081767 A1    Mar. 20, 2014

(51) Int. Cl.
   G06Q 30/02    (2012.01)
   H04N 21/262   (2011.01)
   H04N 21/81    (2011.01)

(52) U.S. Cl.
   CPC ............ G06Q 30/0241 (2013.01); G06Q 30/02 (2013.01); *H04N 21/26241* (2013.01); *H04N 21/26266* (2013.01); *H04N 21/812* (2013.01)

(58) Field of Classification Search
   CPC .................................................. G06Q 30/0269
   USPC ........................................................ 705/14.66
   See application file for complete search history.

(56) References Cited

U.S. PATENT DOCUMENTS

2010/0106556 A1*    4/2010    Vee et al. .................. 705/10

OTHER PUBLICATIONS

Proceedings of the Fourth SIAM International Conference on Data Mining (edited by Michael W. Berry 2004.*
Mahmoud (JIRSS vol. 2 No. 1, pp. 53-114) (Mahmoud) p. 76-78.*
EDBT'08, Mar. 25-30, 2008, Nantes, France "Why go Logarithmic if We can go Linear? Towards Effective Counting of Search Traffic" by Ahmed Metwally, Divyakant Agrawal(Ask dot com) and Amr El Abbadi(UC Santa Barbara).*

* cited by examiner

*Primary Examiner* — Thomas M Hammond, III
*Assistant Examiner* — Breffni X Baggot
(74) *Attorney, Agent, or Firm* — Fountainhead Law Group PC

(57) ABSTRACT

Estimating a number of unique ad impressions in a streaming video system includes defining parameters of an ad campaign and a desired number of ad impressions for the campaign. A computer system determines a discrete probability distribution of video advertising segments per unit time per client device in a population of video advertising segments streamed to a plurality of client devices, based on historical data. The system randomly samples the probability distribution without replacement, based on the defined number of desired ad impressions. An enhanced binary search algorithm may be used for the sampling. Each sample of the probability distribution identifies a number of ads streamed to a different client device in the probability distribution. The system determines, based on the sampling, a number of unique client devices included the samples, thus obtaining an estimate of unique ad impressions for the defined ad campaign.

16 Claims, 10 Drawing Sheets

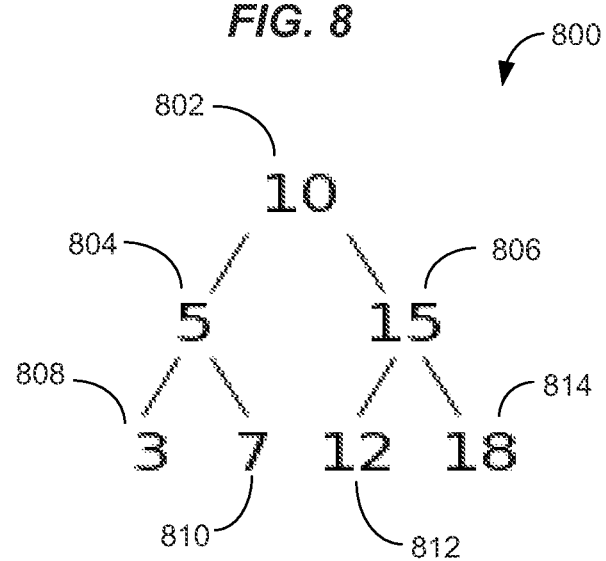
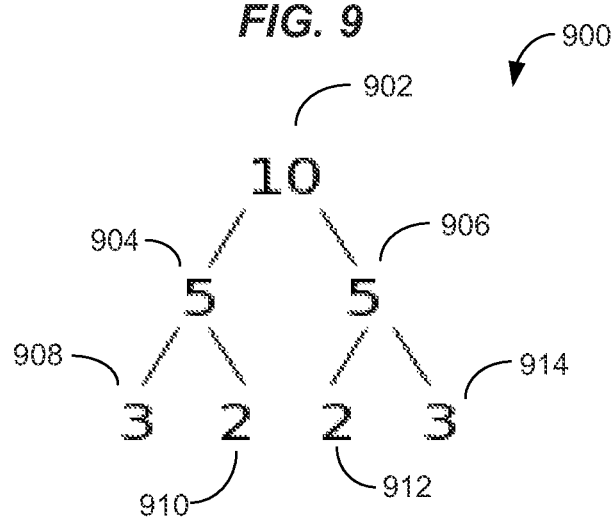

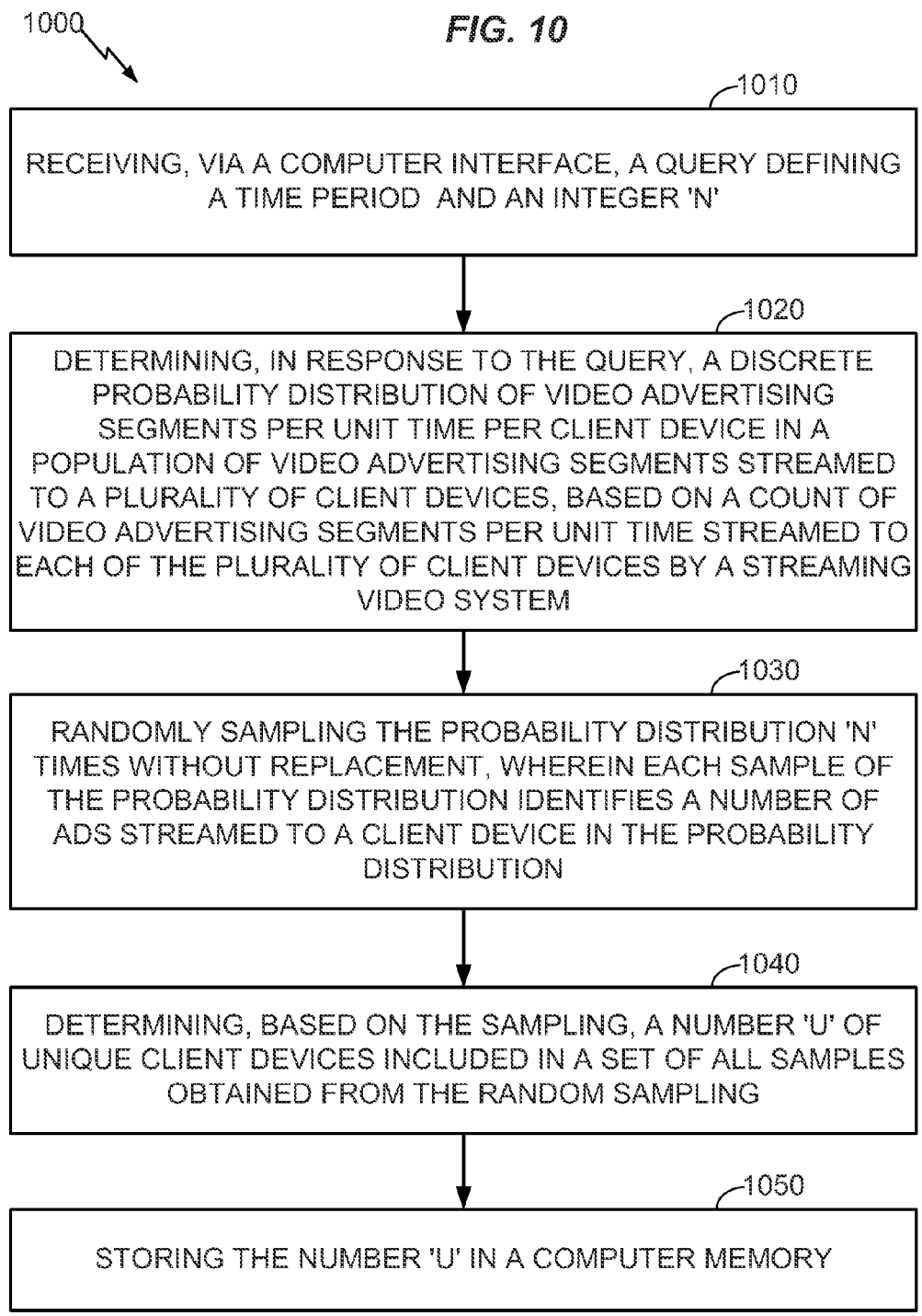

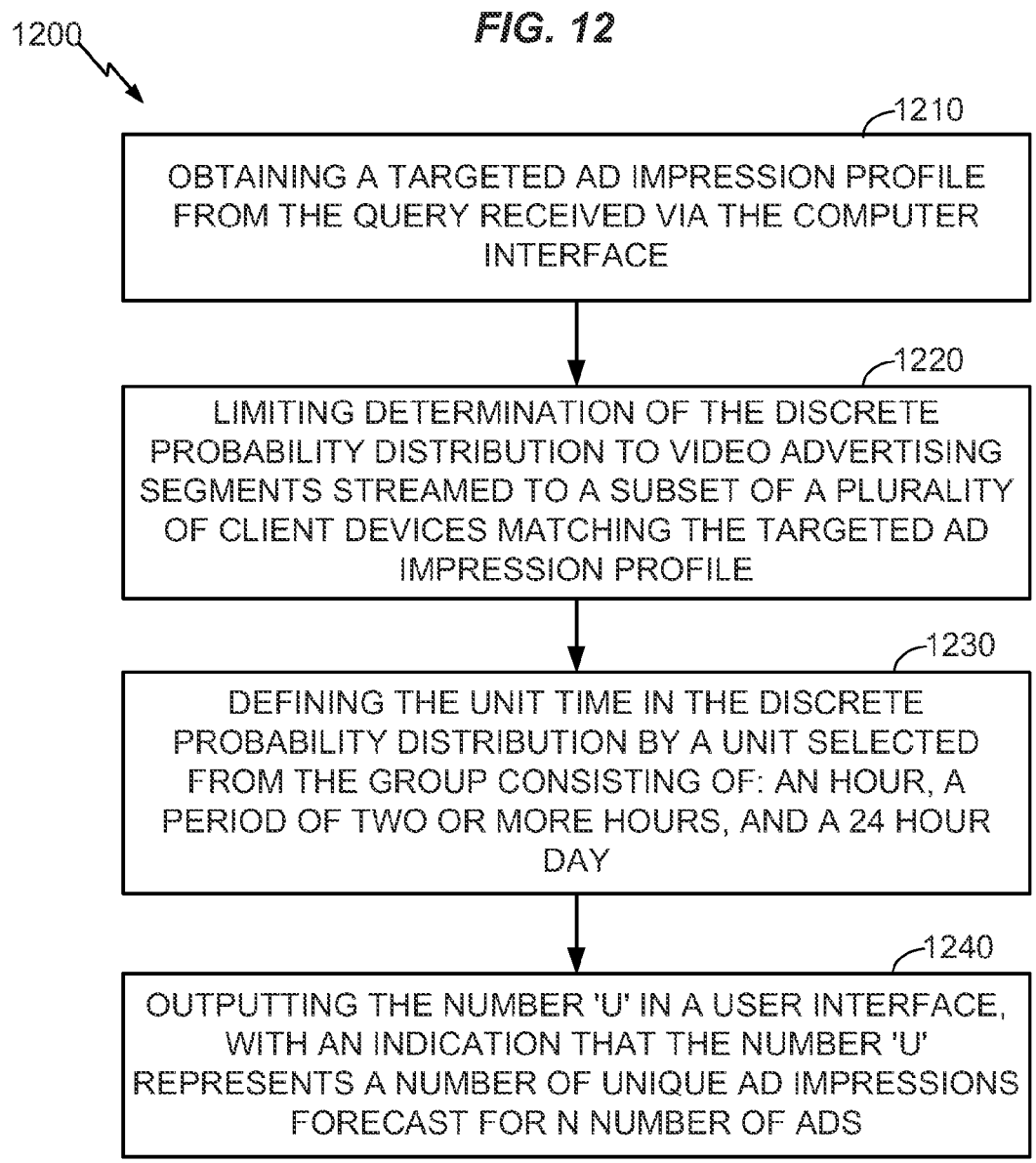

1310 — RANDOMLY SAMPLING THE PROBABILITY DISTRIBUTION USING A BINARY SEARCH ALGORITHM

1320 — CONFIGURING A DATA STRUCTURE USED FOR RANDOMLY SAMPLING THE PROBABILITY DISTRIBUTION, ENABLING COMPLETING THE 'N' SAMPLES IN AN AMOUNT OF TIME PROPORTIONAL TO LOG(N)

1330 — CONFIGURING THE DATA STRUCTURE AS A SEARCH TREE, AND CONFIGURING EACH NODE OF THE SEARCH TREE AS A COUNT REPRESENTING A CORRESPONDING DISCRETE VARIABLE OF THE DISCRETE PROBABILITY DISTRIBUTION

1340 — CONFIGURING EACH NODE OF THE SEARCH TREE IN THE BINARY SEARCH ALGORITHM AS A COUNT REPRESENTING AN OFFSET FROM AN ADJACENT NODE OF THE SEARCH TREE

1350 — ARRANGING THE SEARCH TREE SO THAT NODES WITH HIGHER COUNTS ARE PLACED NEAR A ROOT NODE OF THE TREE ized above. An apparatus may include, for example, a
ESTIMATING UNIQUE IMPRESSIONS IN AN ONLINE VIDEO DISTRIBUTION SYSTEM

FIELD

The present application relates generally to input/output processing using a computer, and more particularly to estimating unique ad impressions—such as a number of unique persons who will view a particular ad or set of ads—in an online video distribution system.

BACKGROUND

Advertising-supported distribution of audio-video data may be implemented from a content server to remote client devices over computer networks, telecommunications networks, and combinations of such networks, using various methods, for example progressive downloading or streaming. Platforms for such distribution may include sites that offer a great variety of different programming, including both newly released episodes of serial programs, major features, documentaries, special events, archives of past episodes and classic serial programs, of different types targeted to users having various different demographic profiles. One or more video ads may be inserted into each video program and sold to advertisers who are charged based on how many times each advertisement is played on a client device; i.e., for each video ad impression.

Prospectively, it may be desirable to provide estimates to advertisers concerning how many ad impressions are available for purchase in a particular future time period for a defined advertising target. Such information, sometimes referred to as "ad inventory" may be useful for planning advertising costs/revenues and generally facilitating commerce. However, because of the complexities of sophisticated video content platforms, prior methods of estimating ad inventory in a streaming video system may be subject to certain shortcomings. For example, prior methods may be inaccurate, inefficient, or both, for estimating a number of unique viewers that will be exposed to one or more ads in a particular ad campaign. Consequently, management of ad inventory based on prior estimation methods may be prone to problems such as unanticipated surpluses or shortages of ad inventory, or high uncertainty regarding the number of different people a particular ad campaign will reach. These and other limitations of prior methods for estimating and managing ad inventory in a streaming video system may be overcome by the novel methods and apparatus disclosed herein.

SUMMARY

Methods, apparatus and systems for estimating unique ad impressions in an online video distribution system are described in detail in the detailed description, and certain aspects are summarized below. This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect, a method for estimating unique ad impressions in an online video distribution system may include receiving, via a computer interface, a query defining a time period and an integer 'N.' The method may further include determining, in response to the query, a discrete probability distribution of video advertising segments per unit time per client device in a population of video advertising segments streamed to a plurality of client devices, based on a count of video advertising segments per unit time streamed to each of the plurality of client devices by a streaming video system. The method may further include randomly sampling the probability distribution 'N' times without replacement, wherein each sample of the probability distribution identifies a number of ads streamed to a client device in the probability distribution. The method may further include determining, based on the sampling, a number 'U' of unique client devices included in a set of all samples obtained from the random sampling, and storing the number 'U' in a computer memory. The method may further include outputting the number 'U' in a user interface, with an indication that the number 'U' represents a number of unique ad impressions forecast for N number of ads.

The method may include defining the unit time in the discrete probability distribution by a unit selected from the group consisting of: an hour, a period of two or more hours, and a 24 hour day. In some embodiments, the method may include streaming video content including the video advertising segments to the plurality of client devices. In such cases, the method may include maintaining, in a computer memory, the count of the video advertising segments per unit time streamed to each of the plurality of client devices by the streaming video system.

In other aspects, the method may include obtaining a targeted ad impression profile from the query received via the computer interface. In addition, the method may include limiting determination of the discrete probability distribution to video advertising segments streamed to a subset of a plurality of client devices matching the targeted ad impression profile.

In other aspects, the method may include randomly sampling the probability distribution using a binary search algorithm. The method may include configuring a data structure used for randomly sampling the probability distribution, enabling completing the 'N' samples in an amount of time proportional to log(N). Furthermore, the method may include configuring the data structure as a search tree, and configuring each node of the search tree as a count representing a corresponding discrete variable of the discrete probability distribution. In addition, the method may include configuring each node of the search tree in the binary search algorithm as a count representing an offset from an adjacent node of the search tree, and/or arranging the search tree so that nodes with higher counts are placed near a root node of the tree.

In related aspects, a computing apparatus may be provided for performing any of the methods and aspects of the methods summarized above. An apparatus may include, for example, a processor coupled to a memory, wherein the memory holds instructions for execution by the processor to cause the apparatus to perform operations as described above. Certain aspects of such apparatus (e.g., hardware aspects) may be exemplified by equipment such as computer servers, personal computers, smart phones, notepad or palm computers, laptop computers, and other computing devices of various types used for providing or accessing information over a computer network. Similarly, an article of manufacture may be provided, including a non-transitory computer-readable medium holding encoded instructions, which when executed by a processor, may cause a client-side or server-side computing apparatus to perform the methods and aspects of the methods as summarized above.

Further embodiments, aspects and details of methods, apparatus and systems for estimating unique ad impressions in an online video distribution system are presented in the detailed description that follows.

BRIEF DESCRIPTION OF THE DRAWINGS

The present technology, in accordance with one or more various embodiments, is described in detail with reference to the following figures. The drawings are provided for purposes of illustration only and merely depict typical or example embodiments of the technology. Like element numerals may be used to indicate like elements appearing in one or more of the figures.

FIG. 8 is a diagram illustrating a binary search tree for sampling a probability distribution used in unique ad impressions estimation.

FIG. 9 is a diagram illustrating an enhanced form of the binary search tree shown in FIG. 8, which may reduce time required for sampling a probability distribution.

FIGS. 10-13 are diagrams illustrating operations that may be performed by a computer server for unique ad impressions estimation.

DETAILED DESCRIPTION

Figure 1:
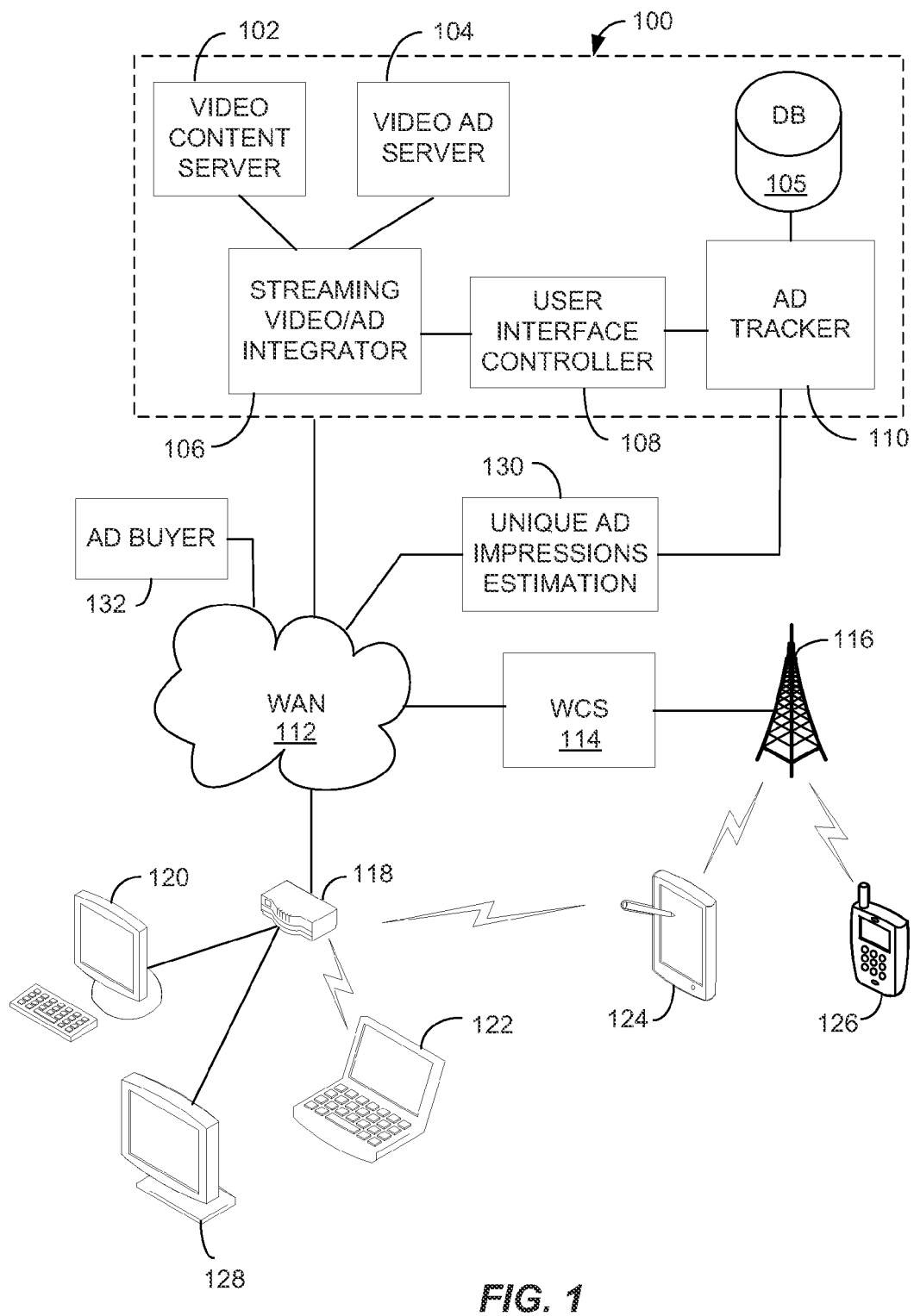
FIG. 1 is a schematic diagram illustrating an embodiment of a computing environment in which systems and methods discussed herein may be implemented.

In the following description, for purposes of explanation, numerous specific details are set forth in order to provide a thorough understanding of one or more embodiments. It may be evident, however, that such embodiments may be practiced without these specific details. In other instances, well-known structures and devices are shown in block diagram form in order to facilitate describing one or more embodiments.

Features and aspects as disclosed herein may be implemented within a system including a video streaming system 100 in communication with multiple client devices via one or more communication networks.

In streaming, a server streams audio-video data continuously to a media player component operating at least partly on the client device, which may play the audio-video data concurrently with receiving the streaming data from the server. The media player component may initiate play of the video data immediately after receiving an initial portion of the data from the content provider. Some streaming techniques use a single provider delivering a stream of data to a set of end users. Unlike progressive downloading, streaming media can be delivered on-demand or live. Progressive downloading may require downloading the entire file or downloading enough of the entire file to start playback at the beginning. In contrast, streaming may enable immediate playback at any point within the file. End-users may skip through the media file to start playback or change playback to any point in the media file. Hence, the end-user does not need to wait for the file to progressively download. Streaming media may be delivered from a few dedicated servers having high bandwidth capabilities.

A streaming media server 100 may be defined as a specialized device that accepts requests for video files, and based on information about the format, bandwidth and structure of those files, serves an amount of data necessary to play the video, at the rate needed to play it. Streaming media servers may also account for the transmission bandwidth and capabilities of the media player on the destination client. Unlike the web server, the streaming media server communicates with the client device using control messages and data messages to adjust to changing network conditions as the video is played. These control messages may include commands for enabling control functions such as fast forward, fast reverse, pausing, or seeking to a particular part of the file at the client. Since a streaming media server may transmit video data only as needed and at the rate that is needed, precise control over the number of streams served can be maintained. Unlike progressive downloading, the viewer is not be able to view high data rate videos over a lower data rate transmission medium. However, streaming media servers (1) provide users random access to the video file, (2) allows monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming media servers may use HTTP and TCP to deliver video streams, but generally use RSTP (real time streaming protocol) and UDP (user datagram protocol). These protocols permit control messages and save bandwidth by reducing overhead. Unlike TCP, when data is dropped during transmission, UDP does not transmit resent requests. Instead, the server continues to send data. Streaming media servers can also deliver live webcasts and can multicast, which allows more than one client to tune into a single stream, thus saving bandwidth.

Progressively downloaded media may often be transmitted to the user device at a rate that is faster than playback, subject to available bandwidth of the communication link or source server. The media program player buffers this data, and may indicate how much of the media program has been buffered by providing an indicator, usually as a part of a "progress bar." A control may often be provided that allows the user to go to any point in the program that has already been buffered by selecting the control and moving it to a different location along the progress bar. This allows the user to randomly access any buffered portion of the media program. In contrast, streaming media players at the client do not rely on buffering to provide random access to any point in the media program. Instead, this is accomplished through the use of control messages transmitted from the media player to the streaming media server.

The delivery of video content by streaming or progressive download may be accomplished under a variety of models. In one model, the user pays for the viewing of each video program, for example, using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." An ad break reserved for one or more video ads to be played in uninterrupted sequence may also be referred to as an "ad pod." With streaming video, the media player may be configured so that the client device cannot play the video without also playing predetermined advertisements during the designated ad slots.

For example, the video streaming system 100 may include one or more computer servers or modules 102, 104, 106, 108 and/or 110 distributed over one or more computers. Each server 102, 104, 110 may include, or may be operatively coupled to, one or more data stores, for example database 105, indexes, files, or other data structures. A video content server 102 may access a data store of various video segments; for example, newly released and archived television episodes, motion pictures, and other content produced as primary content of interest to consumers. The video content server 102 may serve the video segments as directed by a user interface controller module 108.

A video advertising server 104 may access a data store of relatively short video segments (e.g., 10 second, 30 second, or 60 second video advertisements) configured as advertising for a particular advertiser or message. The advertising may be provided for an advertiser in exchange for payment of same kind, or may comprise a promotional message for the system 100, a public service message, or some other information. The ad server 104 may serve the video advertising segments as directed by the user interface controller 108.

An advertising tracking server 110 may keep track of program and advertising views for video content streamed from the system 100 to client devices. Client devices may be configured to transmit a first signal, sometimes referred to as a "start beacon" to the system 100 (e.g., to ad tracker 110) at the onset of each video segment playing on the client. Similarly, the client may transmit a second signal, sometime called an "end beacon" to the system when a video segment has finished playing on the client device. The ad tracking server 110 may process start and end beacons for video ads received by the system 100, together with information concerning the program and user profiles which with each beacon is associated, to develop records regarding video advertising views related to program type, program identifier, user demographic, user identifier, client device identifier, beacon time and date, and other associated information. The ad tracking server 110 may store these records in a data structure, for example in a relational database 105.

The video streaming system 100 may include, or be communicatively coupled to, a unique ad impressions estimation server 130. The unique ad impressions estimation server may be communicatively coupled to one or more network nodes 132 for prospective ad buyers via WAN 112 or other connection. The ad buyer node 132 may operate a terminal interface or message system for communicating with an ad inventory module operating in the server 130. A person wishing to purchase distribution of a particular video ad or set of video ads for an ad campaign may send an inquiry to the unique ad impressions estimation server 130, based on parameters as more particularly described herein. The unique ad impressions estimation server 130 may receive and process such queries to determine available ad inventory and provide estimates in response to such queries. During such processing, the inventory management server 130 may communicate with the ad tracker 110 and/or the database 105 to obtain access to historical data concerning video advertising views in relation to specific programs or user demographics. The inventory management server may use the historical data to provide a basis for estimating ad inventory for some defined future time period.

Among other things, as a component of ad inventory management, the estimation server 130 may estimate unique video ad impressions expected to be achieved by particular video ad campaigns that are targeted in a defined way. A count or estimate of unique ad impressions refers to the number of unique persons who will view a particular ad or set of ads in a targeted ad campaign, and/or to a number of unique client devices on which the ad or set of ads are played. In contrast, an ordinary or non-specified ad impression simply refers to the fact that an ad is viewed or played, without regard to the number of different people who view it. Thus, for example, the same ad viewed or played ten times by the same person counts as ten impressions and one unique impression, while if viewed or played once each by ten different people counts both as ten impressions and ten unique impressions. To estimate anticipated unique impressions for an ad campaign, the server 130 may model unique video ad impressions using a logarithmic time algorithm sampling from a discrete probability distribution, as described in detail later in the specification. The management server 130 may report an estimated number of unique impressions for a defined ad campaign to the ad buyer node 132. A reported estimate may provide a basis for negotiating an advertising fee, and/or for adjusting parameters of the ad campaign.

As used herein, "ad inventory" does not refer to a definite, countable quantity of already-produced items such as might be stored in a warehouse. Each ad impression made by a streaming video ad is consumed the instant it is produced, so there can no store of inventory. Instead, as understood in the art and as used herein, "ad inventory" refers to a quantity of future ad impressions estimated to be available in a streaming video system during some defined future time period. Estimations may be based on a current state of the system, historical data regarding ad impressions, and/or other parameters. Ad inventory may be restricted to and thereby partly defined by a targeted scope based on selected demographic, geographic, program content type, or other parameters. For example, ad inventory may be estimated for video programs targeted to a particular geographic region or user demographic.

The video streaming system 100 may further include an integrator component 106 that integrates video content and video advertising into a streaming video segment as directed by the controller 108. The controller 108 may determine the selection or configuration of advertising in the streaming video based on any suitable algorithm or process, and provide ad tracking data to the ad tracker 110. The video streaming system 100 may include other modules or units not depicted in FIG. 1, for example administrative servers, commerce servers, network infrastructure, advertising selection engines, and so forth.

The video streaming system 100 may connect to a data communication network 112. A data communication network 112 may comprise a local area network (LAN), a wide area network (WAN), for example, the Internet, a telephone network, a wireless cellular telecommunications network 114, or some combination of these or similar networks.

One or more client devices may be in communication with the video streaming system 100, via the data communication network 112 and/or other network 114. Such client devices may include, for example, one or more laptop computers 122, desktop computers 120, "smart" mobile phones 126, notepad devices 124, network-enabled televisions 128, or combinations thereof. Each of the client devices may be communicatively coupled to the video streaming system 100 via a router 118 for a LAN, via a base station 116 for a wireless telephony network 114, or via some other connection or combination of connections. In operation, such client devices 120, 122, 124, 126, 128 may send and receive data or instructions to the system 100, in response to user input received from user input devices or other input. In response, the system 100 may serve video program segments and selected video advertising content to the client devices 120, 122, 124, 126, 128. The devices 120, 122, 124, 126, 128 may output video content from the streaming video programs and video advertising segments using a display screen, projector, or other video output device. In certain embodiments, the system 100 configured in accordance with the features and aspects disclosed herein may be configured to operate within or support a cloud computing environment. For example, a portion of, or all of, the servers 102, 104 or 110 may reside in a cloud server.

Figure 2:
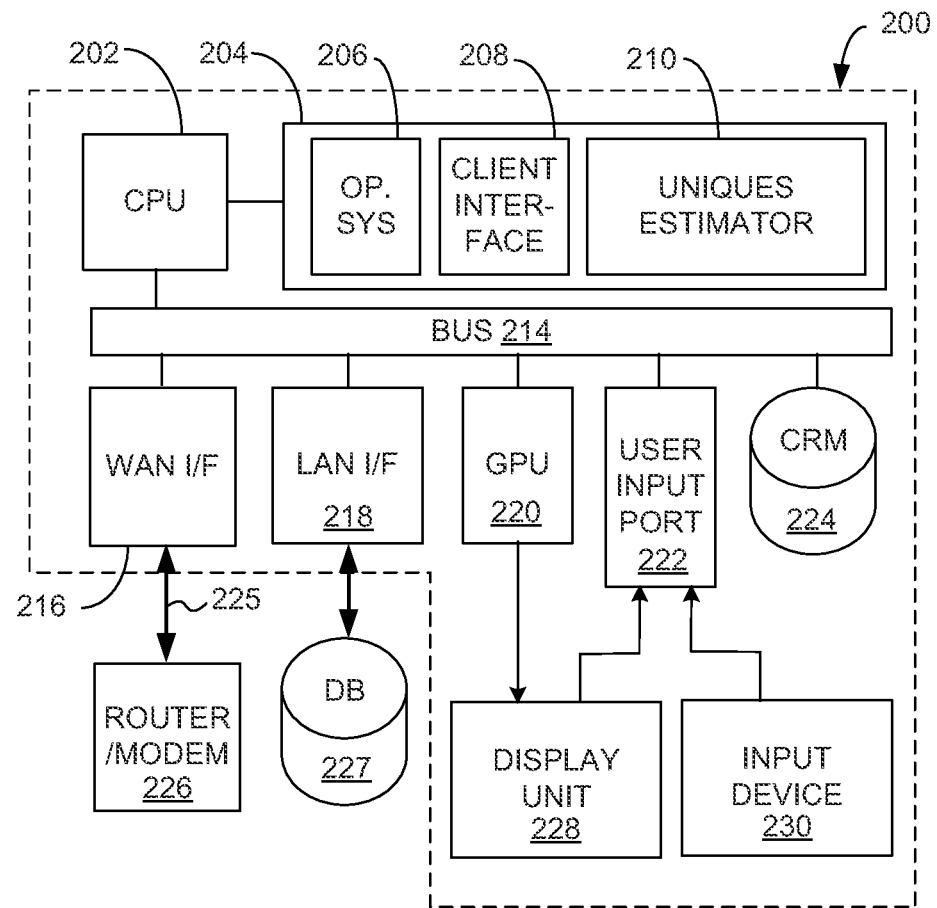
FIG. 2 is a schematic block diagram illustrating an embodiment of a network computing device for supporting and executing the systems and methods described herein.

Referring to FIG. 2, a diagrammatic view of an example unique ad impressions estimation server 200 is illustrated. For example, the server 130 or system 100 shown in FIG. 1 may be configured as or include such unique ad impressions estimation server 200, which may also be referred to as a computer, server, or computer server. In selected embodiments, the unique ad impressions estimation server 200 may include a processor 202 operatively coupled to a processor memory 204, which holds binary-coded functional modules for execution by the processor 202. Such functional modules may include an operating system 206 for handling system functions such as input/output and memory access, a client interface 208 for communicating with one or more ad buyer clients (e.g., ad buyer 132 as shown in FIG. 1), and unique impressions estimator module 210 for determining estimates of numbers of unique ad impressions expected to result from defined ad campaigns.

The client interface component 208 may enable entry of query parameters, for example, date ranges for ad campaigns, ad targeting information for ad campaign, and desired numbers of total and/or unique impressions desired for an and campaign. Results of the estimation process may also be communicated to end users via the client interface module 208. The unique impression estimator module 210 may comprise a component of a more general module, for example an ad inventory estimator module (not shown). An ad estimator module may determine estimates of available ad inventories based on a current system state including future program schedules and libraries, historical ad viewing data, and queries received via the client interface module 208. Estimates of unique ad impressions may be provided as a part of such estimates of available ad inventories.

A bus 214 or other communication component may support communication of information within the computer 200. The processor 202 may be a specialized or dedicated microprocessor configured to perform particular tasks in accordance with the features and aspects disclosed herein by executing machine-readable software code defining the particular tasks. Processor memory 204 (e.g., random access memory (RAM) or other dynamic storage device) may be connected to the bus 214 or directly to the processor 202, and store information and instructions to be executed by a processor 202. The memory 204 may also store temporary variables or other intermediate information during execution of such instructions. For example, the memory 204 may hold a representation of a binary search tree optionally formatted as a flat array using an array representation. In addition, a binary search algorithm executing on the array may store results in a hash table tracking a cumulative sum of estimated unique ad impressions. In the alternative, or in addition, the binary search tree and/or search results hash table may be stored in the computer-readable medium 224.

A computer-readable medium in a storage device 224 may be connected to the bus 214 and store static information and instructions for the processor 202; for example, the storage device 224 may store the modules 206, 208, and 210 when the unique ad impressions estimation server 200 is powered off, from which the modules may be loaded into the processor memory 204 when the client 200 is powered up. The storage device 224 may include a non-transitory computer-readable medium holding information, instructions, or some combination thereof, for example instructions that when executed by the processor 202, cause the unique ad impressions estimation server 200 to perform one or more operations of a method as described herein.

A communication interface 216 may also be connected to the bus 214. The communication interface 216 may provide or support two-way data communication 225 between the unique ad impressions estimation server 200 and one or more external devices, e.g., the streaming system 100 or ad buyer node 132, optionally via a router/modem 226 or other connection. In the alternative, or in addition, the unique ad impressions estimation server 200 may include a Local Area Network (LAN) interface 218 communicatively coupled to a database server 227, from which the server 200 may obtain information regarding system content libraries and schedules, and historical ad view data categorized by user demographics, program attributes, geographical data, or other characteristics, for processing to provide ad inventory estimates.

The unique ad impressions estimation server 200 may be connected (e.g., via the bus 214 and graphics processing unit 220) to a display component 228. A display component 228 may include any suitable configuration for displaying information to a user of the unique ad impressions estimation server 200. For example, a display component 228 may include or utilize a liquid crystal display (LCD), touchscreen LCD (e.g., capacitive display), light emitting diode (LED) display, projector, cathode ray tube (CRT), or other display device to present information to a user of the unique ad impressions estimation server 200 in a visual display.

One or more input devices 230 (e.g., an alphanumeric keyboard, microphone, keypad, remote controller, touchscreen, camera or camera array) may be connected to the bus 214 via a user input port 222 to communicate information and commands to the server 200. In selected embodiments, an input device 230 may provide or support control over user selection input, for example, control of a cursor or highlight. Such a selection indicator control device, for example a pointing device, may be configured as a mouse, a trackball, a track pad, touchscreen, cursor direction keys or other device for receiving or tracking physical movement and translating the movement into electrical signals indicating movement of a user selection indicator. The selection indicator control device may be incorporated into the display unit 228, for example using a touch sensitive screen. A selection indicator control device may communicate direction information and command selections to the processor 202 and control selection indicator movement on the display 228. A selection indicator control device may have two or more degrees of freedom, for example allowing the device to specify selection indicator positions in a plane or three-dimensional space.

Execution of sequences of instructions contained in main memory 204 may cause a processor 202 to perform one or more of the procedures or steps described herein. In selected embodiments, one or more processors 202 in a multi-processing arrangement may also be employed to execute sequences of instructions contained in main memory 204. Alternatively, or in addition thereto, firmware may be used in place of, or in combination with, software instructions to implement procedures or steps in accordance with the features and aspects disclosed herein. Thus, embodiments in accordance with the features and aspects disclosed herein may not be limited to any specific combination of hardware circuitry and software.

Figure 3:
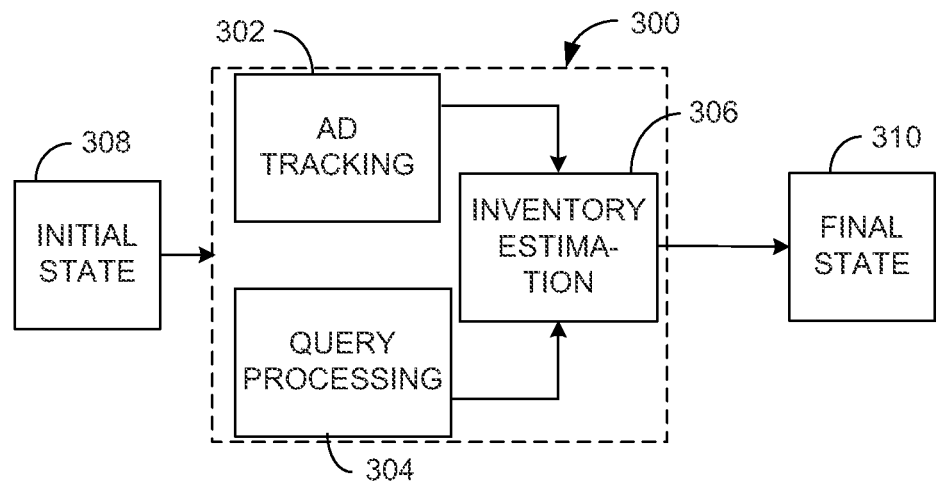
FIG. 3 is a state diagram illustrating general aspects of a unique ad impressions estimation process.

Referring to FIG. 3, general aspects of a unique ad impressions estimation process 300 used for providing estimates of unique ad impressions anticipated for an ad campaign in a streaming video system are illustrated as a state diagram. The initial state 308 represents a current state of available programs, content libraries, and historical ad view data for a particular video streaming service at a particular point in time, plus an ad query for a defined future time and target demographic. The initial state 308 may be represented in a computer memory in various ways, for example by a database of library content characterized by type, schedule of expected future new releases, historical ad views broken down by program and user demographic, and a structured query form. It should be appreciated that the server system state is constantly changing as users continue to access the streaming system, new content is added, and old content deleted, and the initial state 308 may therefore represent a system state as it exists at a particular instant of time, for example at the time that a query requesting an estimate of ad inventory is submitted to the system. It should be appreciated that the initial state 308 represents a particular physical state based on video content representative of physical display output, records of past events defined by physical interactions with client devices, and a record defining a query inferred from physical inputs to a query client machine.

The inventory management process 300 is (or includes) an input-output computation process performed by a computer processor, which operates on the initial state 308 to output at least one final state 310. The final state 310 represents a particular estimate of anticipated unique ad impressions determined from the state data 308, i.e., from a defined physical state. The ad estimate represents an amount of a physical resource, for example "end beacon" events for a defined set of video ads predicted to occur on unique physical client machines in a future time period, computed from the initial physical state 308. In that sense, the inventory management process 300 determines an estimate of the amount of a physical resource (inventory of unique ad impressions) that will be contained in a physical medium (a defined targeted ad space) based on physical measurement data (historical data). The process 300 may therefore operate as a state machine that accepts the initial state 308 representing a physical state of a streaming video system and transforms it into a final state 310 representing a related physical quantity. Subsequently, the final output state 310 being an estimate of a future physical state can be fulfilled in physical outputs from clients connected to a video streaming service, for example by inserting particular video advertisements into selected content streamed from the system at a managed rate determined by the estimate.

The unique ad impressions estimation process 300 may include several interactive modules, for example, a historical ad tracking module 302, a query processing module 304 and a unique ad impressions estimation module 306. The module 300 may include other modules, for example, a user interface module, commerce module, graphics module, etc., which for illustrative simplicity are not shown.

The ad tracking module 302 may record ad viewing events based on signals received from client devices, for example start beacons and end beacons, and gather information regarding program and user parameters. Such parameters may include a physical location or estimated physical location of the client device; or demographic factors such as age, gender, education level; and interest or preference data. The module 302 may determine location parameters by network address, GPS or cellular triangulation, user self reporting via a questionnaire, or other method. The module 302 may determine demographic or interest parameters by user self reporting via a questionnaire, user profile, analyzing past browsing, video viewing, or ad selection history, or other method. The module 302 may further gather program parameters for programs in which video ads are viewed, and record viewing data in a relational database. In addition, the ad tracker module 302 may, through an administrative interface, participate in configuring or maintaining the relational database or data structure.

The query processing module 304 may receive and process a query requesting a particular estimate of unique impressions. This module 304 may serve a data collection form to gather structured query parameters, and/or process query strings using a predefined syntax. Query parameters may include, for example, definition of a future period for a prospective ad campaign, number of unique impressions desired, and targeted demographic or geographic area.

The unique ad impressions estimation module 306 may receive inputs from the ad tracking module 302 and the query module 304, and use those inputs for determining an estimate of unique ad impressions using an algorithm operating on the inputs based on the time model to produce the estimate. Examples of suitable algorithms are provided in the detailed description below. The unique ad impressions estimation module 306 may output a data signal indicating a value of the resulting estimated ad inventory, which may be stored in a computer memory and/or displayed using a computer display device.

Figure 4:
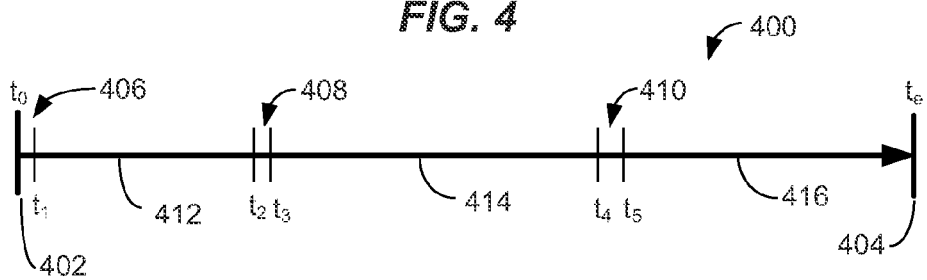
FIG. 4 is a line diagram illustrating aspects of a video segment including ad slots.

The resulting estimate of unique ad impressions may be related to patterns such as video streaming systems may adopt for inserting video ads in program content. For example, a specific pattern of inserting video ads may be used to obtain an estimated number of unique ad impressions during the period of an ad campaign. FIG. 4 is a line diagram illustrating aspects of a video segment timeline 400 including an example of a pattern including ad slots 406, 408 and 410, sometimes referred to as "ad pods." A video segment includes video data characterized by a sequence of video frames that are output in order at a defined frame rate to generate video output. As such, a video segment includes an initial or first frame at inception time "$t_0$" 402 of video output, and each subsequent frame is output at a defined time "t" after inception until a terminal or end time "$t_e$" 404. Thus, each frame defines a particular time or "temporal point" in the streaming video segment, typically measured from the time of inception. For example, for a video configured for 30 frames per second, the $300^{th}$ frame defines a temporal point 10 seconds after inception. A temporal point in a streaming video segment may sometime be referred to herein as a "location" in relation to a progress bar, time line or other time indicator.

Any non-negative, integral number of ad slots 406, 408 and 410 may be configured in the video time line. Each ad slot may be defined by a location and duration. For example, the first ad slot 406 is located at "$t_0$" and has a duration of "$t_1$-$t_0$"; the second ad slot 408 is located at "$t_2$" and has a duration of "$t_3$-$t_2$"; and the third ad slot 410 is located at "$t_4$" and has a duration of "$t_5$-$t_4$". The inter-slot portions 412, 414 and 416 are used for playing requesting video content, and the ad slots are used for playing video advertisements. A streaming media player operating on the client device may cause the video content to play in the defined inter-slot portions 412, 414, 416 and stream advertising videos of appropriate duration in all of the ad slots 406, 408, 410.

Figure 5:
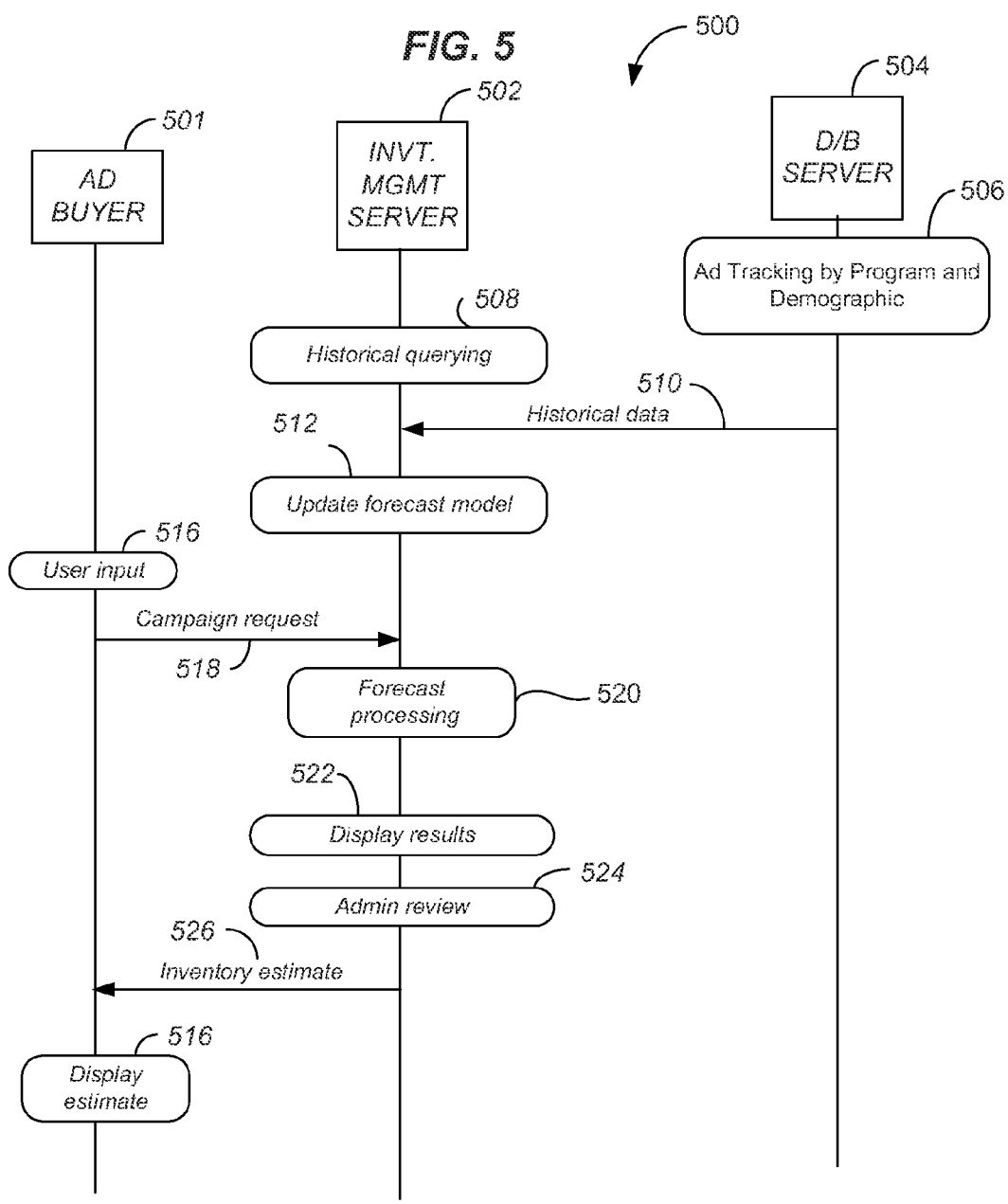
FIG. 5 is a sequence diagram illustrating an example of a call flow between system components in a sequence using estimation of unique ad impressions in a video streaming system.

FIG. 5 illustrates an example of a call flow 500 between an ad buyer node 501, an inventory management server 502, and a database server 506 for estimating and managing ad inventory based on a current state of a video streaming system, including estimating a number of unique ad impressions. The servers 501, 502 and 504 may each be, or may include, a computing device including one or more processors coupled to a memory and other components as described in more detail herein, or as known in the art. As prelude to the call flow 500, an example of call flow for video streaming provided by a video streaming server through a web page interface and streaming media players installed at numerous client devices is first described without reference to a figure. The inventive concepts herein are not limited to such environments.

If a web page environment is used, a call flow may initiate with the client devices (not shown) displaying a web (e.g., World Wide Web) page received from a video streaming system (also not shown) including links for requesting one or more video segments. For example, the web page may comprise a "home" or personalized page including a list of selected video segments of general interest, or selected as likely to be of interest to a specific user based on a user profile. The client device may receive user input selecting one of the links, for example, a "point and click" input from a pointing device, a touch input on a touchscreen device, or a spoken command. In response to the input, the client device may request a specific video segment by transmitting a Hypertext Transfer Protocol (HTTP) "get" request, or other suitable request message, to the video streaming system.

In response to receiving the request message, the video streaming system may determine a selection of advertising videos and ad slots for the video segment requested by the request message. In so doing, the server system may access a record pertaining to user preferences or past activity by a user identified, for example by a user account, as making the request for the video segment. Any suitable method may be used to select the video advertisements, which may include consideration of user input and related communication between each client and the video streaming server. An output of the determining process may include video ad identifiers included in streaming data.

The streaming video system may stream the video segment configured with video advertising. The client device may play the streaming video segment configured with video advertising at designated ad slots using a media player component. Video advertisements may be selected by the streaming video system just prior to each ad slot being encountered at the client, or in advance of initiation of a streaming session. Each client device may play each streaming video until reaching one or more designated ad slots. In some embodiments clients may request a video ad in response to detecting the beginning of a designated ad slot, such as, for example, about five seconds before reaching the ad slot during play of a streaming video. An ad server of the video streaming system may serve the video ad to clients in response to each request. In alternative embodiments, an ad server may automatically select and include a streaming video ad in the content streamed to the client device, without responding to a request from the client for a video ad. When each client has finished playing an ad, it may transmit an end beacon to an ad server. Upon receiving each such end beacon, the ad server may create a record including at least an identifier for the program and video ad, and time the end beacon was received. In addition, the record may include a user or session identifier and other information. The ad server may continually provide such records to the database server 504 operating an ad tracking process 506. Using a relational data structure, each end beacon event record may thereby be related, via included program, user, or session identifiers to one or more demographic, geographic, or other targeted parameters. The database server 504 may maintain all such records in a data structure, or compress the records using a counting process to keep a more limited set of counting data of ad impressions for each targeted parameter and program, in particular time increments.

Periodically, or in response to defined events, the inventory management server 502 may update a time model used for forecasting ad inventory. As part of an update, the server 502 may perform historical querying 508 and obtain requested historical ad viewing data 510 from the database server 504. The inventory management server 502 may test a current forecast model against historical data, and adjust (update) parameters of the forecast model 512, so that the model better matches historical measured results for recent comparable time periods. An aspect of the forecast model 512 may include estimating a number of unique ad impressions anticipated for the ad campaign, using one or more algorithms as described herein.

From time to time an ad buying node 501 may receive user input 516 generating a query or ad campaign request 518, which is transmitted to inventory server 502. In response, the server 502 may process the request 520 using campaign parameters (e.g., attributes of targeted viewers, program parameters, geographic area, and/or time period) using the most current forecast model to obtain a resulting inventory estimate, which it may display 522 to a system administrator. A system administrator may compare the requested ad buy to the estimated inventory 524, and if sufficient inventory exists, reserve the requested inventory for the ad buy. Conversely, if insufficient inventory exists in the specified time frame for the ad campaign, the administrator may contact the ad buyer to define alternative campaign parameters for a second estimate. In either case, the inventory management server 502 may transmit 526 an inventory estimate to the ad buyer node 501. The ad buyer node 501 may display details of the inventory estimate, which if necessary may guide the ad buyer into redefining ad campaign details to ensure that sufficient inventory is available to carry out the contemplated campaign. Thus, a unique ad impressions estimation process at the server 502 may be used manage allocation of ad inventory of the streaming video system for one or more ad campaigns.

Unique Impression Estimation

The problem of estimating how many unique users a given advertising campaign will reach may be resolved using an algorithmic approach. For example, given two input factors, such as the number of ad views the advertising campaign is scheduled to deliver and the dates the campaign is scheduled to run, an algorithm may be used to predict the number of unique users the campaign will reach.

A rudimentary approach at solving this problem may include computing an average number of ad views per unique user in the given time period. For example, to estimate unique users reached for a two-week long campaign with one million ad views, an algorithm may operate as follows:

1. From historical data compute the average number of impressions seen by system users over two weeks, e.g., "$I_{avg}$".
2. Estimate a total number of impressions expected for the ad over the two-week campaign period, e.g., "T".

3. Calculate the estimated number of unique users the ad will reach during the same two-week period by the ratio $T/I_{avg}$.

This rudimentary approach drastically underestimates the actual number of unique impressions under most circumstances. For example, supposing that all users watched $I_{avg}$ ads in a two-week period, then this approach is actually calculating the smallest possible number of unique users that can be reached for T number of total impressions. Clearly, the actual number of unique users will usually be greater than a minimum estimate.

Figure 6:
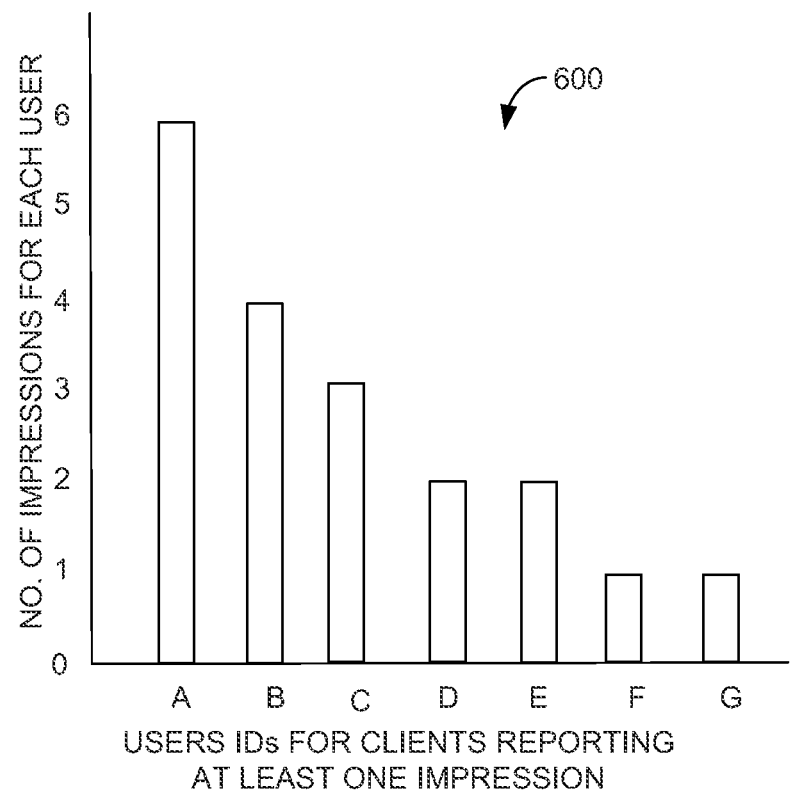
FIG. 6 is a chart illustrating a probability distribution of viewers per number of ad impressions, as may be used in unique ad impressions estimation.

To more accurately estimate the number of unique viewers of this campaign, an algorithm may be used to account for the distribution of views by users; that is, how many users watched 1 ad in the time period, how many watched 2 ads, how many watched 3 ads, and so forth. In other words, a population distribution over number of ads watched in a defined period of time may be determined, based on historical data. The defined period of time may be any useful unit, for example, a 24-hour period, hour, or other time interval of desired granularity. FIG. 6 shows an example of a historical population distribution 600 for video ad views. In this example, for an advertising campaign of defined scope, two different users ('F' and 'G') have viewed one ad each, another two different users ('D' and 'E') have viewed two ads each, another user ('C') has viewed three ads, another user ('B') has viewed four ads, and another user ('A') has viewed six ads. The total number of views for this sample is 19, which can be obtained by summing the individual views. It should be appreciated that a typical sample in a large streaming video system may comprises hundreds of thousands, or millions, of views. The distribution of views specifies a discrete probability distribution; the probability that a given view reaches a given user is the number of ad views for that user divided by the total number of ad views over all users.

Once the population distribution 600 is defined, the system may run a simulation based on the defined population distribution. Generally, to determine a number of unique views for an ad having T estimated total impressions, based on a historical or assumed distribution of views per user, the system may randomly pick T views out of the distribution and keep track of how many unique users are included in the random picks. Details of this simulation process may be handled in various ways. For example, using the example illustrated by FIG. 6, to determine an expected number of unique viewers for an ad campaign estimated to have ten total ad views out of a distribution including nineteen total views, the system may select random numbers between one and nineteen until ten unique random numbers are obtained in the interval one through nineteen, inclusive. After each random selection, the algorithm may remove the selected view from the pool of available views. According to one approach, the population distribution may be correlated to a set of intervals as shown in Table 1, wherein each letter designation represents a different user ID:

TABLE 1

| USERS | VIEWS INTERVAL |
|---|---|
| G | 1 (1 total) |
| F | 2 (1 total) |
| E | 4 (2 total) |
| D | 6 (2 total) |
| C | 9 (3 total) |
| B | 13 (4 total) |
| A | 19 (6 total) |

With reference to Table 1, the information in the right column of the table may be represented by the end points of the listed intervals, for example by the increasing series 1, 2, 4, 6, 9, 13 and 19. Of these values, the middle value is 6 and the series may be represented by the binary tree 700 shown in FIG. 7. The tree 70 may be arranged such that moving down rightward branches of the tree leads to smaller node values, while moving down leftward branches leads to larger node values. The uppermost node may be assigned a middle value for the series represented by the tree. Each node except for the uppermost node has only one upward-leading branch, and may have zero, one, or two downward-leading branches. Examples of uses of similar binary trees in binary search algorithms are described in the detailed description below.

Figure 7:
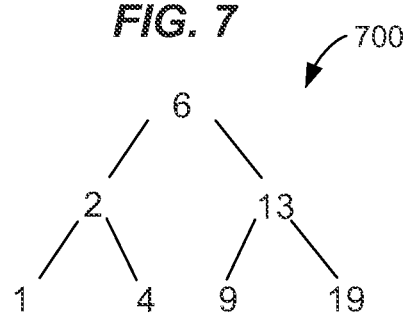
FIG. 7 is a diagram illustrating a binary search tree based on the probability distribution shown in FIG. 6.

Continuing the example illustrated by FIGS. 6 and 7, supposing ten random numbers selected between 1-19, each of these will fall in one of the intervals designated by the series 1, 2, 4, 6, 9, 13 and 19, if the samples are taken with replacement. However, more accurate results may be obtained by sampling without replacing each sample taken. Therefore, the population of available samples should be decremented in a particular way after each sample; in effect, the number sequence (e.g., 1, 2, 4, 6, 9, 13 and 19) may be changed in a particular way depending on the sample taken. For example, if the first random number chosen is 9, this falls in the sequence from 6-9 recorded for the user 'C.' Then, the system may record 'C' as the user identifier, and change the series representing the sample population distribution to 1, 2, 4, 6, 8, 12 and 18. The next sample may be randomly selected between 1 and 18, and the process continued. After all ten samples are taken, the system may readily determine the number of unique users included in the randomly selected samples, representing an estimate of the number of unique users that may be reached by an ad campaign consisting of ten total impressions over a targeted population of nineteen impressions.

Basic Random Selection Algorithms

The random selection of views out of the views-per-user distribution may be analogized to the drawing of colored balls at random out of a bag where the number of balls of each color is known. In a streaming video system, user IDs are analogous to the different colors of the balls, and the total number of ad views during the ad campaign is analogous to the number of balls in the bag. For a large streaming video system, there may be millions of "colors" (individual users), with numbers of total ad views over typical ad campaign periods several times greater than the number of users. Therefore, an efficient system should use an algorithm that scales well with the number of users and that performs each selection operation quickly and efficiently, possibly with the help of pre-computations. Details of efficient algorithms are discussed in the paragraphs below.

Two related selection problems in random sampling from a static discrete probability distribution may be considered. The first is the classic problem of drawing from a discrete distribution with replacement where the distribution is not altered after every draw. Algorithms for this problem are well known and some examples of standard algorithms are discussed below. The second, more difficult, problem is to draw from a distribution without replacement wherein the distribution is altered after every draw by decreasing the count of the drawn color by one. An extension to one of the standard algorithms for solving the first problem is described herein, that allows the extended algorithm to handle the problem of the changing distribution with the same asymptotic runtime efficiency as achieved by algorithms for solving the first problem.

Conventional algorithms for solving the classic problem of drawing a random color from the distribution with replacement include a simple linear search and a faster binary search. A linear search solves the problem by iterating through the distribution. For example, given the distribution in the form of a hash map mapping colors (unique users) to number of ads viewed per user, and using conventional random number generation routines, a linear search algorithm may operate as outlined by the C# code shown in Table 2 below:

TABLE 2

```
//randomly choose an integer between 0 (inclusive)
//and sumCounts (exclusive)
int randInt = random(0, sumCounts);
int curSum = 0;
foreach (string color in dist.keys)
    int colorCount = dist[color];
    curSum += colorCount;
if (curSum > randInt)
    return color;
```

This solution requires O(n) time where n is the number of colors. Computation time is linear with n and cannot be shortened if processing the distribution selecting each random user (color). However, by invoking the selection operation many times on a distribution, a better amortized bound may be achieved using some pre-computation.

A binary search algorithm determines in which interval the randomly chosen integer falls. As an example, suppose the distribution has 3 red balls, 2 green balls and 1 white ball. In this distribution, an algorithm may select a random integer from 0 to 5 (6 possible choices corresponding to the 6 balls). The red interval may be defined as 0 to 2, the green interval by 3 to 4, and the white interval by 5 to 5. The end points of the intervals, 2, 4 and 5 respectively, will always be strictly increasing, and so a binary search may be performed over them. Pre-computation is required to compute the end points of the intervals, but after that, randomly choosing a color is an O(log n) operation. That is, computation time is proportional to log(n), where n represents the number of colors (unique users). A binary search algorithm may operate as outlined by the pseudo code shown in Table 3 below:

TABLE 3

```
//Pre-computation
int[ ] partialSums = new int[dist.length];
string[ ] colorMap = new string[dist.length];
int psumInd = 0;
foreach (string color in dist.keys)
{
    if (psumInd == 0)
        partialSums[psumInd] = dist[color];
    else
        partialSums[psumInd] = partialSums[psumInd – 1] +
dist[color];
    colorMap[psumInd] = color;
    psumInd++;
}
//Choosing a random color
int randInt = random(0, sumCounts);
/*
If randInt is not in the array, most binary search
implementations will allow you to compute which index it
would be in if it were inserted into the array in sorted
order. This is the index we want.
*/
int colorInd = binarySearch(partialSums, randInd);
return colorMap[colorInd];
```

The binary search algorithm requires O(n) of computational time for the pre-computation step of determining the intervals, which is done once for the distribution. It requires O(log n) for the random selection operation.

Another approach may require O(1) time for the random selection operation; i.e., linear time dependent only on the number of samples, and independent of n. The distribution array may be expanded, for example creating an array of length 6 with 3 reds, 2 greens, and 1 white for the above example. This approach uses memory space proportional to the sum of all the counts of the colors, which may be impractical and/or uneconomical for current systems if the number of colors (different users) is very large. If memory space is not an issue, then expanding the distribution array may provide the fastest implementation of the selection operation.

An Extension: Selection without Replacement

The algorithms described above solve the problem of drawing from the probability distribution with replacement, but do not solve for a distribution without replacement. For the problem of estimating unique ad impressions, it is more accurate to do simulations without replacement, because each sample represents a viewing event that has already occurred and cannot be repeated. The algorithm should therefore "keep the ball out of the bag," as it were, and alter the original distribution by decreasing the count of the chosen color by one.

If the binary search algorithm as summarized above is applied without replacement, the system will need to update a partial sum array after each selection. For example, the system would need to decrease the partial sum of every element whose index is greater than or equal to the index of the chosen color. This update requires O(n) time, making the final running time of the solution O(n). It would be preferable to preserve the O(log n) bound for a solution without replacement. To solve the main difficulty of updating all counts after a certain index, a solution algorithm may be extended to use a modified binary search tree that supports bulk updates.

First, consider a standard binary search tree where each node stores a color and the partial sum of the color, as shown in Table 4:

TABLE 4

```
class Node
{
    int partialSum;
    String color;
    Node left, right;
}
```

The tree satisfies the standard binary search property, in that every node in the left sub-tree of a node has a smaller partial sum, and every node in the right sub-tree has a larger partial sum. A compact example of such a binary search tree 800 is illustrated in FIG. 8. Each node of the tree 800, including for example the top node 802, left node 804, right node 806, left-left sub-node 808, left-right sub-node 810, right-left sub-node 812 and right-right sub-node 814, represents an end point of a selection interval, out of an increasing series of such end points. The top node 802 represents the median value end point of the series. The remaining end points are arranged in decreasing value to the right, and increasing value to the left. For example, left node 804 is less than top node 802, right node 806 is greater than top node 802, and so forth for the sub-nodes 808, 810, 812, and 814.

Searching through this tree 800 is efficient, but simulating "selection without replacement" means that the values of one or more nodes may need to be changed after each selection. For example, a selection in the interval of 6-10 may require that the top node 802 be decremented by one to a value of nine, and that all left-side nodes 806, 812 and 814 also be decremented by one. This decrementing accounts for the removal of the selected value from the pool of available selections, which also shrinks by one. For example, if the tree 800 represents 18 possibilities, a random number may be selected from the set of 1-18 (e.g., generated in the interval of 1-18). After the first selection, only 17 possibilities are left, and so the random number is selected from the interval of 1-17. Thus, one or more nodes of the tree 800 must be updated after each selection, which may slow down computation from seconds to hours for large binary trees.

To enable efficient bulk updating all the nodes in the right sub-tree of a given node, the tree 800 may be modified to become the tree 900 shown in FIG. 9. The modified tree 900 includes the same information as the original tree 800, but in modified form enabling efficient updating of all the nodes in the tree 900 whose partial sum is greater than the chosen partial sum. The modified form may comprise storing the partial sums of the nodes in each right sub-tree as a delta from the root of that tree, as exemplified by comparing corresponding nodes of the modified tree 900 to the original tree 800.

In the modified tree 900, each node is computed and stored as a delta (difference) from the partial sum value of its most immediate left ancestor, wherein "left ancestor" refers to the next higher-level node that is positioned to the left of the child node. If a node has no left ancestor, the partial sum of the node is stored directly. Thus, for example, the node pairs 802 and 902, 804 and 904, and 808 and 908 store the same partial sums, because these nodes have no left ancestors. The remaining nodes in the modified tree 900 store respective difference values from their respective most immediate left ancestor in the original tree 800. For example, the most immediate left ancestor of node 812 is node 802 (because node 806 lies to node 812's right), and therefore node 912 corresponding to node 812 holds the difference between node 812 and its most immediate left ancestor node 802, which difference is this example is equal to two.

The stored values in the modified tree 900 do not necessarily satisfy the binary search property. The binary search property is, however, satisfied by the implied values of tree 900, i.e., by the partial sums represented in the original tree 800. As a binary search algorithm traverses the tree 900, it can quickly compute the implied value of any node by keeping track of the accumulated deltas as it goes, updating the total if and only if traversing down the right branch of a node. Thus, the modified tree 900 enables a binary search algorithm to efficiently update the counts of all nodes that follow the chosen node. This feature may be appreciated by noting that the set of all nodes that follow any randomly chosen node is not just the nodes in the right sub-tree of the chosen node. For example, the set of all nodes greater than the node 904 (value 5) of the tree 900 includes node 910 (value 2+5=7), as well as node 902 (value 10) and all the nodes in node 902's right sub-tree. The set of all nodes greater than the chosen node 904 is precisely the union of the right sub-trees of all ancestor nodes (in this example, node 902) from which we went left in order to arrive at the chosen node 904. The count of all these greater nodes may be decremented by decreasing the count of all such greater ancestors in the modified tree 900 by one. There are log(n) ancestors in a balanced tree (more about this below) so this algorithm runs in O(log n) time.

A C# (C Sharp) implementation of an algorithm for binary search without replacement is shown in Table 5 below:

TABLE 5

```
public int Draw( ) {
    if (_totalSum == 0) {
        throw new Exception("Tried to draw from empty dist.");
    }
    int r = rand.Next(0, _totalSum);
    Node n = Search(_tree, r);
    _totalSum--;
    return n.index;
}
/*
Try to find the least node whose partial sum is greater
than the targetDelta
*/
private Node Search(Node node, int targetDelta) {
    if (targetDelta > node.delta || node.delta == 0) {
        if (node.right == null) {
            /*
            No Nodes in this subtree have partial sum greater
            than the targetDelta
            */
            return null;
        } else {
            /*
            All nodes in the right subtree have partial sum ncreased
            by the delta of the root. Handle this by decreasing target
            delta.
            */
            return Search(node.right, targetDelta - node.delta);
        }
    } else {
        /*
        Update delta of ancestors that are greater than the
        chosen node
        */
        node.delta--;
        if (node.left == null) {
            return node;
        } else {
            /*
            Search the left subtree for the smallest node whose
            partial sum is greater than target delta. If none exists,
            then the root is the node we want.
            */
            Node leftSearch = Search(node.left, targetDelta);
            return leftSearch == null ? node : leftSearch;
        }
    }
}
```

Balancing the Search Tree

As noted, it may be advantageous to balance the binary search tree so that each selected node has at most $\log_2(n)$ ancestors, wherein n is the number of unique viewers. In the described streaming video system implementation, the number of nodes is determined prior to constructing the search tree, by the sorted partial sum array, also described as an increasing series of interval endpoints in connection with FIGS. 6-7 above. Therefore, building a balanced binary tree right may be accomplished by taking the midpoint of the array as the root or top node, recursively building a tree out of the left sub-array (i.e., the interval endpoints less than the midpoint) and attaching it as the left child of the root. Similarly, a tree may be recursively constructed out of the right sub-array (i.e., the interval endpoints greater than the midpoint) and attached as the right child of the root node. A C# implementation of an algorithm for constructing a balanced search tree is shown in Table 6 below:

TABLE 6

```
/*
psums is the sorted array of partial sums to convert into
a tree, minInd and maxInd define the portion of the array
we are working on, curSum is our current delta for the
```

TABLE 6-continued

```
         right subtree
         */
         private Node BuildTree(int[ ] psums, int minInd, int
      maxInd, int curSum) {
         if (minInd > maxInd)
            return null;
         Node ret = new Node( );
         int mid = (minInd + maxInd) / 2;
         ret.index = mid;
            ret.delta = psums[mid] - curSum;
            ret.left = BuildTree(psums, minInd, mid - 1, curSum);
            ret.right = BuildTree(psums, mid + 1, maxInd,
         psums[mid]);
         return ret;
         }
```

Optimizations

Instead of explicitly storing the nodes of a binary search tree, an estimation system may reduce computational inefficiency by storing the tree in a flat array using an array representation of a binary tree. In the array representation of a binary tree, the root is at index 0 and the left and right children of a node at index i are at 2i+1 and 2i+2, respectively. For the array to not contain any null entries, it is necessary for our binary tree to be both balanced and complete, that is, all the nodes are filled in from left to right at each level, and we go to the next level only after the current level is full.

Building a complete tree out of a sorted array may be more complex, because taking the midpoint may no longer suffice to provide a balanced tree. This is because, in a complete tree, nodes are filled in from left to right, so generally the left sub-tree will have more nodes than the right sub-tree. In turn, the index of the root node will tend to be larger than the midpoint of the array. To compute the index of the root, the estimation system may first have to compute the depth of the tree and the number of nodes in the last level.

For example, an estimation system may be tasked with computing the index of the root in a tree with 40 nodes. The system may perform an algorithm to complete this task, as follows:
1. Determine the largest power of two less than 40 (the number of nodes), which is $32=2^5$. Thus, a complete tree with 40 nodes will be a complete tree with five levels plus a partially filled sixth level.
2. Place $2^5-1=31$ nodes in the first five levels. One of them is the root which leaves 30 non-root nodes. Place half (15) of the non-root nodes in the left sub-tree, and the remainder of the non-root nodes in the right sub-tree.
3. Determine the capacity of the last, partially filled level and allocate nodes from left to right. In this example, the sixth level can hold up to $2^5=32$ nodes. The first 16 of these will be in the left sub-tree. 40 minus 31 equals 9, so there will be 9 nodes in the sixth level. Because 9 is less than 16, all 9 nodes are in the left sub-tree.
4. Determine the index of the root node based on the number of nodes in the left sub-tree. In this example, the total number of nodes in the left sub-tree is 15+9=24. Therefore, the root is the 25th node and is at index 24.

A modified C# coded version of the above algorithm for building a complete binary tree and determining the root index is provided in Table 7:

TABLE 7

```
int numNodes = maxInd - minInd + 1;
   int pow2 = 1;
while (true) {
      if (pow2 * 2 - 1 > numNodes) {
         break;
      }
   pow2 *= 2;
}
int maxLeavesBefore = pow2 / 2;
pow2--;
int numBefore = (pow2 - 1) / 2;
   numBefore += Math.Min(numNodes - pow2, maxLeavesBefore);
int mid = numBefore + minInd;
Node ret = new Node( );
   ret.index = mid;
   ret.delta = psums[mid] - curSum;
   ret.left = BuildTree(psums, minInd, mid - 1, curSum);
   ret.right = BuildTree(psums, mid + 1, maxInd,
psums[mid]);
return ret;
}
```

Possible Improvement

The enhanced binary search algorithm as described herein has proven fast enough for unique ad impression estimation in a video streaming system for ad campaigns with total impressions and viewers on the order of $10^6$. However, the algorithm may be improved in some respects, for example in the construction of the binary tree. As described herein, a complete binary tree is constructed without requiring every node to have a strictly ordered value. However, because a search can be terminated as soon as it finds the chosen node, the average running time of the algorithm may be improved by placing nodes with larger counts closer to the root, because such nodes have a higher probability of being selected. Therefore, the search algorithm will not have to traverse as deeply into the tree, on average, to find the chosen nodes. This improvement will not improve the worst case time bound of this algorithm from O(log n), but should result in faster execution times in practice.

Example Methodologies and Apparatus

The foregoing examples may be embodied in one or more methodologies performed by a computer, for example a client device, server, or some combination of a client device and server. Methodologies that may be implemented in accordance with the disclosed subject matter will be better appreciated with reference to various flow charts. Although methodologies are shown and described as a series of acts/blocks for simplicity of illustration, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored as encoded instructions and/or data on an article of manufacture, for example, a non-transitory computer-readable medium, to facilitate storing, transporting and transferring such methodologies to various devices. Those skilled in the art will understand and appreciate that a method could alternatively be represented as a series of interrelated states or events, such as in a state diagram.

As shown in FIG. 10, a computer server system may perform a method 1000 for unique ad impressions estimation in a video streaming system. The method 1000 may include, at 1010, receiving, via a computer interface, a query defining a time period and an integer 'N'. For example, a user interface component operating on a server for performing ad inventory estimation may receive parameters defining an ad campaign, including a desired time period, targeting parameters, and a number of total ad impressions and/or unique ad impressions desired during the specified period. The server may process the incoming data and store it in a temporary memory for use providing an estimate of unique ad impressions. The server may interpret the integer 'N' as specifying a desired number of total ad impressions, and/or a desired number of unique ad impressions, or some related number.

The method 1000 may further include, at 1020, determining, in response to the query, a discrete probability distribution of video advertising segments per unit time per client device in a population of video advertising segments streamed to a plurality of client devices, based on a count of video advertising segments per unit time streamed to each of the plurality of client devices by a streaming video system. An example of a probability distribution is provided herein above at FIG. 6. For example, different targeting cuts (combinations of targeting parameters) may be used to build and analyze a time-dependent viewership model aggregated from models for individual programs, wherein historical views as tracked by targeted attributes are extrapolated for future periods. Each client device may be associated with an identified user, or may be tracked as used by an unidentified guest based on a cookie or other identifier for the client device. Extrapolated future ad views may be allocated to a data table, based on a time-dependent viewership model, and distributed according to number of ads viewed per viewer.

The method 1000 may further include, at 1030, randomly sampling the probability distribution 'N' times without replacement, wherein each sample of the probability distribution identifies a number of ads streamed to a client device in the probability distribution. For example, the server may use an enhanced binary search algorithm to perform a random number of samples equal to a number of total ad impressions requested by the query (e.g., the integer 'N'), or to an estimated number of total ad impressions for the specified query as provided by a separate estimating process.

The method 1000 may further include, at 1040, determining, based on the sampling, a number 'U' of unique client devices included in a set of all samples obtained from the random sampling. For example, the server may sum a ratio of interval counts divided by the number of ads viewed for each interval and count to obtain an estimate of unique views for the distribution, as described in more detail above in connection with FIGS. 6 and 7. The method 1000 may further include, at 1050, storing the number 'U' in a computer memory. The number 'U' may represent a number of unique client devices and/or users that will view at least one ad in the ad campaign specified by the query. This number may be reported to a person originating the query via a client interface and used for any suitable purpose. For example, the number may be used in an iterative process for obtaining a targeted estimated number of unique impressions based on one or more ad campaign parameters, and/or used for some other purpose, or for determining a price charged for the ad campaign.

Figure 11:
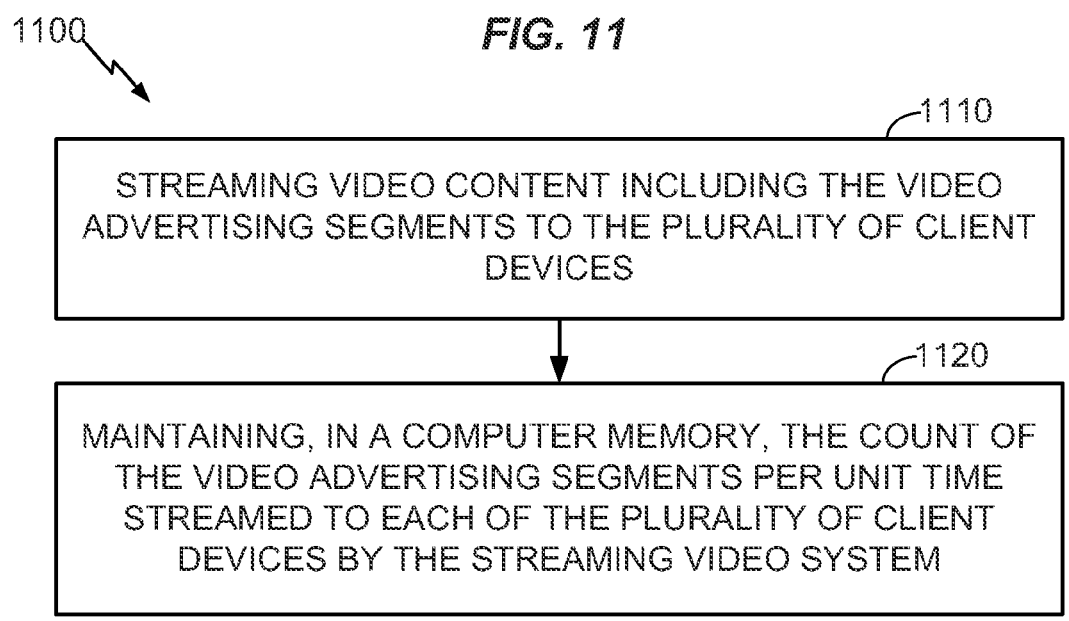

With reference to FIGS. 11-13, several additional operations 1100, 1200 and 1300 are depicted for estimating unique ad impressions in a video streaming system, which may be performed by a computer server, alone or in combination with a client device and/or another server. One or more of operations 1100, 1200 and 1300 may optionally be performed as part of method 1000. The elements 1100, 1200 and 1300 may be performed in any operative order, or may be encompassed by a development algorithm without requiring a particular chronological order of performance. Operations can be independently performed and are not mutually exclusive. Therefore any one of such operations may be performed regardless of whether another downstream or upstream operation is performed. For example, if the method 1000 includes at least one of the operations 1100, 1200 and 1300, then the method 1000 may terminate after the at least one operation, without necessarily having to include any subsequent downstream operation(s) that may be illustrated.

In an aspect, with reference to FIG. 11, the method 1000 may further include additional operations 1100 for managing and tracking ad inventory in a streaming video system. The additional operations may include, at 1110, streaming video content including the video advertising segments to the plurality of client devices, for example selecting video ads and including selected video ads in streaming video sessions initiated at the request of users operating connected client devices. The method 1000 may further include, at 1120, maintaining, in a computer memory, the count of the video advertising segments per unit time streamed to each of the plurality of client devices by the streaming video system. A tracking server may allocate the count according to one or more targeting parameters and a specified granularity of time periods, for each program in its library. The tracking server may further track how many times each user or identified client device plays particular identified video ads. Such data may be useful for estimating future probability distributions for particular programs and targeted attributes.

In other aspects, with reference to FIG. 12, the method 1000 may further include additional operations 1200 for estimating unique ad impressions. The additional operations may include, at 1210, obtaining a targeted ad impression profile from the query received via the computer interface. For example, the query may specify targeted demographic or behavioral parameters for the ad, a targeted geographic area or time of day, targeted program genres or types, and other information used to control distribution of video ads in the video streaming system. In the alternative, the system may use a default or assumed targeting profile. In a related aspect, the method 1000 may further include, at 1220, limiting determination of the discrete probability distribution to video advertising segments streamed to a subset of a plurality of client devices matching the targeted ad impression profile.

In another aspect, the method 1000 may further include, at 1230, defining the unit time in the discrete probability distribution by a unit selected from the group consisting of: an hour, a period of two or more hours, and a 24 hour day. In another aspect, the method 1000 may further include, at 1240, outputting the number 'U' in a user interface, with an indication that the number 'U' represents a number of unique ad impressions forecast for the 'N' number of total ad impressions defined by the query.

With reference to FIG. 13, the method 1000 may further include additional operations 1300 for estimating the number of unique impressions using one or more algorithms. The method 1000 may include, at 1310, randomly sampling the probability distribution using a binary search algorithm. For example, a basic or enhanced binary search algorithm may be executed by a server to perform the sampling. Examples of binary search algorithms are provided in the disclosure above.

In a related aspect, the method 1000 may further include, at 1320, configuring a data structure used for randomly sampling the probability distribution, for example as an enhanced binary tree, enabling completing the 'N' samples in an amount of time proportional to log(N). In more particular detail, the method 1000 may further include, at 1330, configuring the data structure as a search tree, and configuring each node of the search tree as a count representing a corresponding discrete variable of the discrete probability distribution. An example of such a tree has been shown and described above in connection with FIG. 9, wherein each node is computed and stored as a difference from the value of its most immediate left ancestor. In an aspect, the count at nodes of the tree having no left ancestor may represent a partial sum or interval of the discrete probability distribution. As is also noted above, a search tree may be represented in an alternative data format, such as by using an array representation. In an enhanced aspect of configuring the search tree, the method 1000 may further include, at 1340, configuring each node of the search tree in the binary search algorithm as a count representing an offset from an adjacent node of the search tree. To improve search performance, the method 1000 may further include, at 1350, arranging the search tree so that nodes with higher counts are placed near a root node of the tree. In other words, the tree may be ordered such that the count value of each node is inversely proportional to its distance from the root node.

Figure 14:
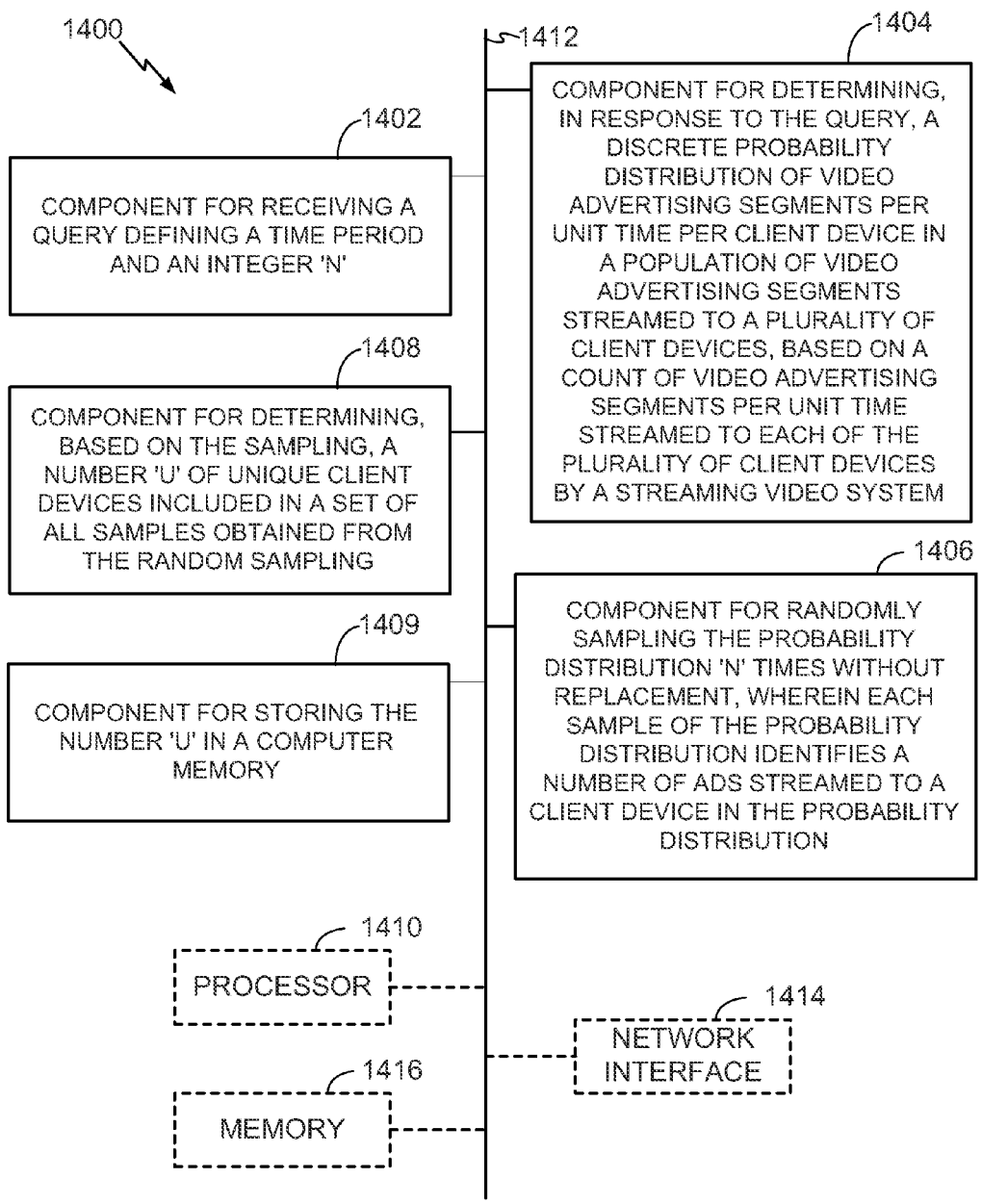
FIG. 14 is a diagram illustrating a computer server configured for estimating unique ad impression in a streaming video system.

With reference to FIG. 14, there is provided an exemplary apparatus 1400 that may be configured as computer server or combination of client and server, for unique ad impressions estimation. The apparatus 1400 may include functional blocks that can represent functions implemented by a processor, software, or combination thereof (e.g., firmware).

As illustrated, in one embodiment, the apparatus 1400 may include an electrical component or means 1402 for receiving a query defining a time period and an integer 'N'. For example, the electrical component or means 1402 may include at least one control processor 1410 coupled to a memory component 1416. The control processor may operate an algorithm, which may be held as program instructions in the memory component. The algorithm may include, for example, establishing a communication session with a client device, using a client interface, receiving data from the client via the client interface, and parsing the received data to identify the time period and integer. The component 1402 or apparatus 1400 may interpret the integer as specifying a desired number of total ad impressions for an ad campaign, a desired number of unique ad impressions for the campaign, or some other value related to these quantities.

The apparatus 1400 may further include an electrical component or module 1404 for determining, in response to the query, a discrete probability distribution of video advertising segments per unit time per client device in a population of video advertising segments streamed to a plurality of client devices, based on a count of video advertising segments per unit time streamed to each of the plurality of client devices by a streaming video system. For example, the electrical component or means 1404 may include at least one control processor 1410 coupled to a memory component 1416. The control processor may operate an algorithm, which may be held as program instructions in the memory component. The algorithm may include, for example, projecting estimated ad views for a specified targeting cut and time period, based on a program schedule an historical data, distributing the estimated views to separate ads-viewed-per-user or ads-viewed-per-device bins as shown in FIG. 6, and counting a number of users/client devices in each bin.

The apparatus 1400 may further include an electrical component or module 1406 for randomly sampling the probability distribution 'N' times without replacement, wherein each sample of the probability distribution identifies a number of ads streamed to a client device in the probability distribution. For example, the electrical component or means 1406 may include at least one control processor 1410 coupled to a memory component 1416. The control processor may operate an algorithm, which may be held as program instructions in the memory component. The algorithm may include, for example, using an enhanced binary search algorithm to randomly take a number of samples equal to a number of total ad impressions requested by the query (e.g., the integer 'N'), or equal to an estimated number of total ad impressions for the specified query as provided by a separate estimating process. The enhanced binary search algorithm may operate as described herein in connection with FIGS. 8-9, and may include one or more aspects as summarized in connection with FIG. 13.

The apparatus 1400 may further include an electrical component or module 1408 for determining, based on the sampling, a number 'U' of unique client devices included in a set of all samples obtained from the random sampling. For example, the electrical component or means 1408 may include at least one control processor 1410 coupled to a memory component 1416. The control processor may operate an algorithm, which may be held as program instructions in the memory component. The algorithm may include, for example, summing a ratio of interval counts divided by the number of ads viewed for each interval and count to obtain an estimate of unique views for the distribution, as described in more detail above in connection with FIGS. 6 and 7.

The apparatus 1400 may further include an electrical component or module 1409 for storing the number 'U' in a computer memory. For example, the electrical component or means 1409 may include at least one control processor 1410 coupled to a memory component 1416. The control processor may operate an algorithm, which may be held as program instructions in the memory component. The algorithm may include, for example, writing the value 'U' to a memory register or other location, or providing the value to a data server for storing in a record of a database.

The apparatus 1400 may include similar electrical components for performing any or all of the additional operations 1100, 1200 and 1300 described in connection with FIGS. 11-13, which for illustrative simplicity are not shown in FIG. 14.

In related aspects, the apparatus 1400 may optionally include a processor component 1410 having at least one processor, in the case of the apparatus 1400 configured as a network entity. The processor 1410, in such case may be in operative communication with the components 1402-1409 or similar components via a bus 1412 or similar communication coupling. The processor 1410 may effect initiation and scheduling of the processes or functions performed by electrical components 1402-1409.

In further related aspects, the apparatus 1400 may include a network interface component 1414 enabling communication between a client and a server. The apparatus 1400 may optionally include a component for storing information, such as, for example, a memory device/component 1416. The computer readable medium or the memory component 1416 may be operatively coupled to the other components of the apparatus 1400 via the bus 1412 or the like. The memory component 1416 may be adapted to store computer readable instructions and data for implementing the processes and behavior of the components 1402-1409, and subcomponents thereof, or the processor 1410, or the methods disclosed herein. The memory component 1416 may retain instructions for executing functions associated with the components 1402-1409.

While shown as being external to the memory 1416, it is to be understood that the components 1402-1409 can exist within the memory 1416.

It should be understood that the specific order or hierarchy of steps in the processes disclosed are merely examples. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The term "non-transitory computer-readable medium" as used herein may refer to any medium that participates in holding instructions for execution by a processor 202, or that stores data for processing by a computer. Such a medium may take many forms, including but not limited to, non-volatile media, volatile media, and temporary storage media (e.g., cache memory). Non-volatile media may include optical discs or magnetic disks, such as used in a data storage device or medium. Volatile media may include dynamic memory, such as a main or cache memory for a computer processor. Common forms of non-transitory computer-readable media may include, for example, a hard (magnetic media) disk, magnetic tape, or any other magnetic medium, a CD-ROM, DVD, Blu-ray or other optical disc or medium, RAM, PROM, EPROM, FLASH-EPROM, solid-state drive (SSD), or any other memory card, chip, or cartridge, or any other memory medium from which a computer can read.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method, comprising:
    streaming video content including the video advertising segments to a plurality of client devices;
    receiving, by a computing device, a query defining a time period and an integer 'N';
    determining, by the computing device, in response to the query, a discrete probability distribution of video advertising segments per unit time per client device in a population of the video advertising segments streamed to the plurality of client devices during ad slots in the video content streamed to the plurality of client devices, based on a count of video advertising segments per unit time streamed to each of the plurality of client devices by a streaming video system;
    storing, by the computing device, a first data structure including a set of nodes used for randomly sampling the probability distribution as a search tree, wherein the set of nodes include a count where every node in a left sub-tree of a node has a smaller partial sum, and every node in a right sub-tree has a larger partial sum;
    modifying, by the computing device, the first data structure to generate a second data structure such that nodes of the search tree in each right sub-tree include a count representing a delta from a partial sum from an adjacent node of the search tree;
    randomly sampling, by the computing device, the probability distribution 'N' times without replacement, wherein each sample of the probability distribution identifies a number of video advertising segments streamed to a client device during the ad slots in the probability distribution;
    determining, by the computing device, based on the random sampling, 'N' client devices using a binary search algorithm on the search tree based on an implied value of nodes that is calculated each sample using deltas of the second data structure to determine the count of the nodes in the first data structure, enabling completing the 'N' samples in an amount of time proportional to log(N);
    updating, by the computing device, a value of only one node of the search tree in the second data structure for each sample taken in the random sampling;
    determining, by the computing device, based on the sampling, a number 'U' of unique client devices included the N client devices, wherein unique client devices are determined to view at least one video advertising segment and a same client device is not represented more than once in the number U; and
    storing, by the computing device, the number 'U' in a computer memory.

2. The method of claim 1, further comprising maintaining, in the computer memory, the count of the video advertising segments per unit time streamed to each of the plurality of client devices by the streaming video system.

3. The method of claim 1, obtaining a targeted ad impression profile from the query.

4. The method of claim 3, further comprising limiting determination of the discrete probability distribution to video advertising segments streamed to a subset of a plurality of client devices matching the targeted ad impression profile.

5. The method of claim 1, further comprising defining the unit time in the discrete probability distribution by a unit selected from the group consisting of: an hour, a period of two or more hours, and a 24 hour day.

6. The method of claim 1, further comprising outputting the number 'U' in a user interface, with an indication that the number 'U' represents a number of unique ad impressions forecast for N number of ads.

7. The method of claim 1, further comprising arranging the search tree so that nodes with higher counts are placed near a root node of the tree.

8. An apparatus, comprising:
at least one computer processor configured for:
streaming video content including the video advertising segments to a plurality of client devices;
receiving a query defining a time period and an integer 'N';
determining, in response to the query, a discrete probability distribution of video advertising segments per unit time per client device in a population of the video advertising segments streamed to the plurality of client devices during ad slots in the video content streamed to the plurality of client devices, based on a count of video advertising segments per unit time streamed to each of the plurality of client devices by a streaming video system;
storing a first data structure including a set of nodes used for randomly sampling the probability distribution as a search tree, wherein the set of nodes include a count where every node in a left sub-tree of a node has a smaller partial sum, and every node in a right sub-tree has a larger partial sum;
modifying the first data structure to generate a second data structure such that nodes of the search tree in each right sub-tree include a count representing a delta from a partial sum from an adjacent node of the search tree;
randomly sampling the probability distribution 'N' times without replacement, wherein each sample of the probability distribution identifies a number of video advertising segments streamed to a client device during the ad slots in the probability distribution;
determining based on the random sampling, 'N' client devices using a binary search algorithm on the search tree based on an implied value of nodes that is calculated each sample using deltas of the second data structure to determine the count of the nodes in the first data structure, enabling completing the 'N' samples in an amount of time proportional to log(N);
updating a value of only one node of the search tree in the second data structure for each sample taken in the random sampling;
determining, based on the sampling, a number 'U' of unique client devices included the N client devices, wherein unique client devices are determined to view at least one video advertising segment and a same client device is not represented more than once in the number U;
storing the number 'U' in a computer memory; and
a memory coupled to the at least one computer processor for storing data.

9. The apparatus of claim 8, wherein the processor is further configured for maintaining, in the computer memory, the count of the video advertising segments per unit time streamed to each of the plurality of client devices by the streaming video system.

10. The apparatus of claim 8, wherein the processor is further configured for processing the query thereby obtaining a targeted ad impression profile.

11. The apparatus of claim 10, wherein the processor is further configured for limiting determination of the discrete probability distribution to video advertising segments streamed to a subset of a plurality of client devices matching the targeted ad impression profile.

12. The apparatus of claim 8, wherein the processor is further configured for defining the unit time in the discrete probability distribution by a unit selected from the group consisting of: an hour, a period of two or more hours, and a 24 hour day.

13. The apparatus of claim 8, wherein the processor is further configured for outputting the number 'U' in a user interface, with an indication that the number 'U' represents a number of unique ad impressions forecast for N number of ads.

14. The apparatus of claim 8, wherein the processor is further configured for arranging the search tree so that nodes with higher counts are placed near a root node of the tree.

15. A computer program product, comprising:
a non-transitory computer-readable medium holding coded instructions, that when executed by a computer processor, cause a computer to perform the operations of:
streaming video content including the video advertising segments to a plurality of client devices;
receiving a query defining a time period and an integer 'N';
determining, in response to the query, a discrete probability distribution of video advertising segments per unit time per client device in a population of the video advertising segments streamed to the plurality of client devices during ad slots in the video content streamed to the plurality of client devices, based on a count of video advertising segments per unit time streamed to each of the plurality of client devices by a streaming video system;
storing a first data structure including a set of nodes used for randomly sampling the probability distribution as a search tree, wherein the set of nodes include a count where every node in a left sub-tree of a node has a smaller partial sum, and every node in a right sub-tree has a larger partial sum;
modifying the first data structure to generate a second data structure such that nodes of the search tree in each right sub-tree include a count representing a delta from a partial sum from an adjacent node of the search tree;
randomly sampling the probability distribution 'N' times without replacement, wherein each sample of the probability distribution identifies a number of video advertising segments streamed to a client device during the ad slots in the probability distribution;
determining based on the random sampling, 'N' client devices using a binary search algorithm on the search tree based on an implied value of nodes that is calculated each sample using deltas of the second data structure to determine the count of the nodes in the first data structure, enabling completing the 'N' samples in an amount of time proportional to log(N);
updating a value of only one node of the search tree in the second data structure for each sample taken in the random sampling;
determining, based on the sampling, a number 'U' of unique client devices included the N client devices, wherein unique client devices are determined to view at least one video advertising segment and a same client device is not represented more than once in the number U;
storing the number 'U' in a computer memory.

16. The method of claim 1, wherein after sampling, the delta from the partial sum from the adjacent node of the search tree for a node is not changed.

* * * * *